United States Patent Office 3,776,882
Patented Dec. 4, 1973

3,776,882
STABILITY OF FIBER-FORMING POLYESTERS
Franz Witzler, Oberbruch, and Hans-Martin Koepp, Erlenbach am Main, Germany, assignors to Glanzstoff AG, Wuppertal, Germany
No Drawing. Filed Apr. 14, 1971, Ser. No. 134,044
Claims priority, application Germany, Apr. 25, 1970, P 20 20 330.9
Int. Cl. C08g 51/60
U.S. Cl. 260—45.9 R
4 Claims

ABSTRACT OF THE DISCLOSURE

Stabilizing fiber- or film-forming polyesters, especially against heat and hydrolysis, by adding and melt-blending therewith a small amount of at least one arylene-bis-carbodiimide as the essential stabilizing agent. The resulting stabilized polyester products are especially useful as filaments or fibers in tire cords.

---

An improvement in resistance to heat and hydrolysis is particularly important and desirable in the case of high quality synthetic linear polymer products such as the filaments or fibers used for tire cords. Polyethylene terephthalate is especially suitable for these purposes because of its various excellent properties, but it can only be used if such properties can be substantially preserved in the course of working up the polymers into melt-spun filaments and when the resulting filaments are put to use as threads, yarns, cords or other textile products. A very high molecular weight is essential for achieving the high mechanical strength values which are required for filaments or threads used as reinforcing inserts in tires, drive belts or the like. The resistance of the filamentary products to hydrolysis also plays a major role; this is influenced to a great extent by the carboxyl end group number of the polyester chains.

The possibilities of adjusting these two properties in the production of polyethylene terephthalate are limited. Furthermore, it is known that a high molecular weight achieved in the course of polycondensation cannot be maintained in the melting process preceding the spinning process without taking special precautions because a certain amount of degradation occurs even at that stage. For example, when melt spinning a polyethylene terephthalate having a viscosity of $\eta_{rel}=1.65$ (measured as the solution viscosity of a 1 g./100 ml. solution of the polyester in m-cresol at 25° C.), a degradation to a viscosity value of about 1.60 occurs during the spinning process if the polymer is heated to 285° C. to 295° C. for about 5 to 10 minutes. A further reduction in viscosity is caused by the action of water at elevated temperatures.

It is known that certain carbodiimides improve the resistance to hydrolysis of a number of polymers. The addition of these compounds has been found to be especially advantageous in the case of those polymers which contain ester groups, for example polyester urethanes. It is further known from the literature that the stabilizing effect of carbodiimides is influenced by the structure of the individual compound. For example, polycarbodiimides which have a molecular weight of over 500 and contain more than 3 carbodiimide groups have been mentioned as being especially advantageous for use as stabilizers for polyester urethanes, whereas aliphatic mono- or bis-carbodiimides having lower molecular weights are said to be less suitable because they are readily extracted by solvents or diffuse out of the polymer at elevated temperatures. See, for example, German printed specification (DAS) No. 1,285,747. Linear polyesters such as polyethylene terephthalate to which the known polycarbodiimides have been added as stabilizers are crosslinked to such a great extent that they cannot be worked up into useful filaments, fibers, threads or even films or similar flexible products.

One object of the present invention is to substantially suppress the disadvantageous influences which are caused by heating fiber-forming or film-forming linear polyesters, especially polyethylene terephthalate, particularly in the presence of water. Another object of the invention is to achieve a stabilization of such synthetic polyesters which is markedly improved without adversely affecting desirable fiber- or film-forming properties. Other objects and advantages of the invention will become more apparent upon consideration of the following detailed disclosure.

It has now been found, in accordance with the invention, that a linear fiber-forming polyester, such as one which consists essentially of polyethylene terephthalate, can be made to exhibit a highly improved stability, particularly a relatively higher solution viscosity with improved resistance to heat and/or hydrolysis, provided that the polyester is treated by adding thereto and melt blending therewith a small amount of at least one bis-carbodiimide of the formula

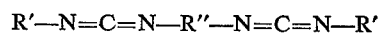

$$R'—N=C=N—R''—N=C=N—R'$$

wherein R' represents a monovalent radical selected from the group consisting of lower secondary or tertiary alkyl, e.g. isopropyl, isobutyl or tertiary-butyl, aryl and especially phenyl, and especially aryl substituted by lower alkyl, e.g. tolyl, xylyl or mesityl.

The term "lower alkyl" is intended to include alkyl of 1 to 6 carbon atoms and especially 1 to 4 carbon atoms. The lower alkyl substituent or substituents on phenyl is preferably a methyl substituent but also preferably includes ethyl or propyl. Substitution preferably occurs in the 2 and/or 6 position or in the 2,4 and 6 positions on the phenyl radical (which is always connected to the nitrogen atom of the bis-carbodiimide in its 1-position). The term "lower secondary or tertiary alkyl" refers to those alkyl of 3 to 6 carbon atoms capable of having a secondary or tertiary carbon atom attached to the nitrogen atom of the bis-carbodiimide, for example the secondary propyl group and especially the secondary- or tert.-butyl group.

The divalent aryl radical R" is preferably phenylene and especially para-phenylene although it is also feasible to employ other closely related aryl radicals such as naphthyl or diphenylene. In general, it is essential that this divalent radical be aromatic while limiting the monovalent radical R' to the prescribed aryl radicals or to the secondary or tertiary lower alkyl radicals. Thus, the bis-carbodiimides employed for purposes of the present invention are essentially distinguished by the fact that they contain at least one up to three aromatic radicals and otherwise not more than two terminal secondary or tertiary lower alkyl radicals.

Among the bis-carbodiimides of the above mentioned formula, p-phenylene-bis-(2,6-xylyl-carbodiimide) and p-phenylene - bis - (tert.-butyl-carbodiimide) have been found to be especially suitable.

One or more of the specified bis-carbodiimides are advantageously added as the stabilizing agent in quantities of about 10 to 150 milliequivalents per kilogram of the polyester just before melt spinning is carried out. The stabilizer can be added by dipping cuttings or granules of the polymer into the stabilizer or by adding the stabilizer directly to the polymer melt during melt spinning. Very uniform distribution of the bis-carbodiimide on the polyester cuttings or granules is achieved by dissolving the bis-carbodiimide in a suitable low boiling inert solvent such as petroleum ether, benzene or dioxane, and then impregnating the polyester particles with this solution. The solvent can then be evaporated off under a vacuum to leave a uniformly distributed residue or coating of the stabilizer on the polyester particles.

It is essential for purposes of the present invention to melt blend the added bis-carbodiimide with the fiber-forming polyester, and this is best accomplished during the normal melting and homogenization of the melt as used in the conventional spinning of polyester filaments, i.e. a spinning of the molten material which is then solidified and drawn into oriented filaments or fibers. The same procedure is generally followed in the melt extrusion of a film or sheet of the polyester, preferably as a blown tubular film, the extruded filmaceous sheet being mono- or bi-axially stretched or drawn to achieve the desired orientation of the linear polyester.

Although some reaction might be expected to occur between the bis-carbodiimides of the present invention and the free carboxyl groups and/or hydroxyl groups in the polyester, there is surprisingly very little if any evidence of cross-linking or reactions which prevent the development of fibrous or filmaceous properties. To the contrary, these properties are enhanced in a surprisingly effective manner so that fiber-forming and film-forming properties are retained while further improving resistance to heating and/or hydrolysis. One can therefore assume that at least part of the carbodiimide reactive groups has reacted in a linear chain coupling reaction, the other remaining unreacted. Because of the extremely complex nature of the melt blended polymeric product and any number of possible side reactions, it has been impossible to establish the exact chemical structure of the product or any theory as to the distinctive behavior of the stabilizing additives of the invention. Nevertheless, repeated experiments have shown a decisive advantage when treating the linear polyester with the at least partly aromatic bis-carbodiimides disclosed herein.

The amount of the bis-carbodiimide added to the polyester can be kept quite small but must be sufficient to exert the desired stabilizing effect, i.e. against heat and/or hydrolysis. As noted above, the preferred amount is about 10 to 150 milliequivalents per kg. of polyester, i.e. generally less than about 4% by weight and preferably about 0.2 to 2.0% by weight. (The term "milliequivalent" is the weight in milligrams which corresponds to one-half the molecular weight of the particular bis-carbodiimide which can be considered as being difunctional with two carbodiimide groups.)

The preparation of the at least partly aromatic bis-carbodiimides employed in this invention can be accomplished in known manner as taught in the following references: Khorana, H. G., "Chem. Revs., 53, 145 (1953); E. Schmidt, N. Seefelder, Liebigs Am. Chem. 571, 83 (1951); Y. Iwakura, K. Naguchi, Bull. Chem. Soc. Japan 40, 2383 (1967).

Mixtures of bis-carbodiimides may also be used, and other additives may also be incorporated in the polyester as are conventional in this art.

The addition according to the invention of bis-carbodiimides of the required formula noted above results in a very marked improvement in the resistance to hydrolysis of the fiber-forming and film-forming polyesters such as polyethylene terephthalate, particularly those which have been prepared with conventional quantities of known catalyst combinations. It is particularly advantageous to use fiber-forming polyesters which have been prepared by polycondensation in intimate contact with known catalyst combinations and also with the usual quantities of oxyacids of phosphorus or esterified derivatives thereof, because these initial polyesters exhibit an even higher resistance to hydrolysis after the specific treatment according to the invention. Especially good results are obtained with polyesters which have been prepared in the presence of phosphoric acid, preferably in quantities of 50 to 500 p.p.m., or in the presence of triphenyl phosphite, preferably in quantities of 100 to 1000 p.p.m., the parts per million being based in each case on the quantity of the polyester. The advantageous results of the invention are readily demonstrated by comparing the viscosity values and especially the number of free carboxyl groups of samples of polyesters which have been subjected to a hydrolysis treatment.

The process according to the invention is further illustrated by but not limited to the following examples.

EXAMPLES 1 TO 8

Dimethyl terephthalate was subjected to ester interchange with ethylene glycol and then polycondensed in known manner with the addition of at least one catalyst and, in some instances, with the addition of phosphoric acid or triphenyl phosphite. The catalysts and the optional phosphorus compounds together with the quantities in which they were used are summarized in Table 1 below. The solution viscosity of the polyethylene terephthalate as the initial polycondensate product was adjusted to a value bewteen 1.59 and 1.66 (measured as a 1 g./100 ml. solution of the polyester in m-cresol at 25° C.). The cuttings produced in conventional manner from this polyester were dried for 4 hours at 150° C. and then uniformly coated with varying quantities of the bis-carbodiimides indicated in Table 1 in which "BCD I" represents p-phenylene-bis-(2,6-xylyl-carbodiimide) and "BCD II" represents p-phenylene-bis-(t-butyl-carbodiimide). The cuttings were then melted at 280° C. under a nitrogen atmosphere in the course of 10 minutes. The solution viscosity and the number of free carboxyl groups were determined before and after melting and also after a hydrolytic treatment in which the ground polyester was heated to 152° C. in a closed tube for 3 hours in the presence of water.

The experimental results are shown in Table 2 in which the polyester samples which had been prepared without a phosphorus compound are entered in the column headed "Polycondensate I" and the polyester samples which had been prepared with the addition of the phosphorus compound mentioned in Table 1 are entered in the column headed "Polycondensate II."

The results clearly show that the addition of aromatic or mixed aromatic-aliphatic bis-carbodiimides in all cases results in an increase in the viscosity of the polyester and that the hydrolytic degradation of the products is less than that of products which do not contain this additive. The improvement which can be achieved is especially remarkable in the case of polyesters which have been polycondensed in the presence of phosphoric acid or triphenyl phosphite. In these cases, a greatly reduced number of free carboxyl groups is also observed which must be regarded as an important improvement in quality.

TABLE 1

| Example No. | Parts per million | | | | | | | |
|---|---|---|---|---|---|---|---|---|
| | $Zn(CH_3COO)$ plus 2 $H_2O$ | $Mn(CH_3COO)$ 2 plus 4 $H_2O$ | $CH_3COOLi$ plus $H_2O$ | $Sb_2O_3$ | $GeO_2$ | $H_3PO_4$ | $P(OC_6H_5)_3$ | BCD |
| 1 | 150 | | | 200 | | 100 | | I |
| 2 | | 240 | | 200 | | 140 | | I |
| 3 | | | 400 | 300 | | 250 | | I |
| 4 | 150 | | | | 100 | 100 | | II |
| 5 | 150 | | | | 100 | | | II |
| 6 | | 240 | | 200 | | | 700 | II |
| 7 | | 240 | | 200 | | | 700 | I |
| 8 | 150 | | | | 100 | | 750 | I |

TABLE 2

| Example No. | | Polycondensate I | | | | | | Polycondensate II | | | | | |
| --- | --- | --- | --- | --- | --- | --- | --- | --- | --- | --- | --- | --- | --- |
| | | Starting material | | 50 meq./kg. BCD | | 100 meq./kg. BCD | | Starting material | | 50 meq./kg. BCD | | 100 meq./kg. BCD | |
| | | Before hydrolysis | After hydrolysis | Before hydrolysis | After hydrolysis | Before hydrolysis | After hydrolysis | Before hydrolysis | After hydrolysis | Before hydrolysis | After hydrolysis | Before hydrolysis | After hydrolysis |
| 1 | LV | 1.64 | 1.45 | 1.87 | 1.46 | 2.03 | 1.65 | 1.65 | 1.54 | 1.84 | 1.80 | 1.86 | 1.87 |
| | COOH | 30 | 42 | 12 | 57 | 4 | 25 | 14 | 27 | 3 | 9 | 3 | 6 |
| 2 | LV | 1.65 | 1.42 | 1.86 | 1.52 | 2.05 | 1.63 | 1.66 | 1.54 | 1.79 | 1.72 | 1.81 | 1.76 |
| | COOH | 15 | 57 | 6 | 43 | 5 | 34 | 12 | 26 | 3 | 12 | 2 | 12 |
| 3 | LV | 1.64 | 1.38 | 1.80 | 1.54 | 1.81 | 1.60 | 1.66 | 1.54 | 1.81 | 1.75 | 1.83 | 1.84 |
| | COOH | 13 | 82 | 3 | 28 | 3 | 18 | 15 | 24 | 4 | 7 | 2 | 5 |
| 4 | LV | 1.66 | 1.47 | 1.84 | 1.74 | 2.10 | 1.79 | 1.62 | 1.50 | 1.89 | 1.74 | 1.83 | 1.82 |
| | COOH | 34 | 62 | 8 | 34 | 3 | 19 | 15 | 30 | 2 | 9 | 2 | 5 |
| 5 | LV | 1.64 | 1.35 | 1.91 | 1.43 | | 1.68 | | | | | | |
| | COOH | 63 | 22 | 26 | 76 | 6 | 51 | | | | | | |
| 6 | LV | | | | | | | 1.59 | 1.43 | 1.87 | 1.68 | 2.20 | 1.86 |
| | COOH | | | | | | | 31 | 58 | 4 | 14 | 3 | 20 |
| 7 | LV | 1.65 | 1.42 | 1.86 | 1.52 | 2.05 | 1.63 | 1.65 | 1.56 | 1.82 | 1.78 | 1.85 | 1.83 |
| | COOH | 15 | 57 | 6 | 43 | 5 | 34 | 21 | 34 | 3 | 4 | ±0 | 3 |
| 8 | LV | 1.66 | 1.47 | 1.84 | 1.74 | 2.10 | 1.79 | 1.65 | 1.54 | 1.77 | 1.73 | 1.78 | 1.78 |
| | COOH | 34 | 62 | 8 | 34 | 3 | 19 | 18 | 35 | 2 | 7 | ±0 | 5 |

EXAMPLES 9 TO 14

Polyethylene terephthalate cuttings prepared from 240 p.p.m. of manganese acetate, 200 p.p.m. of antimony trioxide and 140 p.p.m. of phosphoric acid (quantities based on polyester) and having an initial viscosity of 1.57 were coated with various carbodiimides, remelted as described in Examples 1 to 8 and treated with water. Other experimental conditions and the results are shown in Table 3.

The symbols used in the table have the following meanings:

BCD I ____ p-Phenylene-bis-(2,6-xylyl-carbodiimide).
BCD II ___ p-Phenylene-bis-(t-butyly-carbodiimide).
BCD III __ p-Phenylene-bis(mesityl-carbodiimide).
BCD IV ___ Tetramethylene-bis-(t-butyl-carbodiimide).
BCD V ___ Cyclohexane-1,4-bis-(methylene-t-butyl-carbodiimide).
OCD VI __ Oligo-2,4-tolyl-carbodiimide, $p_n$=4.4.
MCD VII _ Di-o-tolyl-carbodiimide.

The products marked with + contained substantial amounts of insoluble components. The solution viscosity of the soluble component was measured as far as possible.

In Table 3, the first group of examples (Examples 9 to 14) shows the effect of the addition according to the invention of the aromatic or mixed aromatic-aliphatic bis-carbodiimides.

Various comparison examples are provided in the second and third groups of Table 3. It will be seen that purely aliphatic bis-carbodiimides (BCD IV and V) have practially no influence on the resistance to degradation by hydrolysis. As regards the carboxyl group number, these additives are distinctly disadvantageous. The addition of the oligo-carbodiimide leads to crosslinking reactions and hence to the formation of insoluble and infusible or difficulty fusible components. Such polyesters are not suitable for further processing up into filaments or fibers. The monocarbodiimide VII in particular shows no effect in increasing the molecular weight.

The advantages obtained in a linear fiber-forming saturated polyester of the polyethylene terephthalate type by the addition according to the invention of certain aromatic or mixed aromatic-aliphatic bis-carbodiimides are also preserved in the filaments spun from the polymer, as the following examples will show. No bis-carbodiimide could be extracted from these filaments, thereby further indicating that a reaction has occurred with the polyester but without any cross-linking injurious to the desired fibrous or filmaceous properties. The stabilizing effect of the bis-carbodiimides was maintained undiminished in all of the processing and textile use of the spun filaments.

TABLE 3

| Example | Carbodiimide | Meq. of carbodiimide/ kg. of polyester | LV Before hydrolysis | COOH Before hydrolysis | LV After hydrolysis | COOH After hydrolysis |
| --- | --- | --- | --- | --- | --- | --- |
| Comparison Example | None | | 1.57 | 35 | 1.43 | 58 |
| 9 | BCD I | 50 | 1.82 | 5 | 1.70 | 12 |
| 10 | BCD I | 100 | 1.88 | 5 | 1.86 | 8 |
| 11 | BCD II | 50 | 1.87 | 4 | 1.68 | 14 |
| 12 | BCD II | 100 | 2.20 | 3 | 1.76 | 20 |
| 13 | BCD III | 50 | 1.85 | 7 | 1.68 | 16 |
| 14 | BCD III | 100 | 1.91 | 3 | 1.85 | 11 |
| Comparison Example | BCD IV | 45 | 1.80 | 20 | 1.41 | 61 |
| | BCD IV | 90 | 2.12 | 10 | 1.35 | 109 |
| | BCD V | 45 | 1.76 | 7 | 1.51 | 29 |
| | BCD V | 90 | 2.11 | 13 | 1.37 | 86 |
| | OCD VI | 45 | (1.95)+ | 2 | (1.71)+ | 25 |
| | OCD VI | 90 | (2.13)+ | 0 | | 10 |
| | CD VII | 65 | 1.57 | 5 | 1.50 | 19 |

EXAMPLES 15 AND 16

Polyethylene terephthalate was prepared in a conventional polycondensation with the use of 240 p.p.m. of maganese acetate, 200 p.p.m. of antimony trioxide and 140 p.p.m. of phosphoric acid, and the polycondensate exhibited a solution viscosity of 1.82, a carboxyl content of 20 meq./kg. and a moisture content of less than 0.006% by weight. This initial polymer in the form of cuttings was coated or dressed with a bis-carbodiimide and melt spun into a 210 filament yarn with a yarn size of 1100 dtex. The filaments of the yarn were stretched or drawn in the ratio of 1:6 and then subjected to hydrolysis (3 hours in water at 152° C.). Other experimental conditions and results are shown in Table 4.

BCD VIII represents hexamethylene-bis-(t-butylcarbodiimide), the other designations being given above.

The figures in Table 4 also clearly show that the addition of aromatic or mixed aromatic-aliphatic bis-carbodiimides affords considerable advantages over purely aliphatic bis-carbodiimides.

TABLE 4

| Example | Carbodiimide | Meq. of carbodiimide/ kg. of polyester | LV Before hydrolysis | COOH Before hydrolysis | LV After hydrolysis | COOH After hydrolysis | Hydrolysed bonds, meq./kg.[1] |
|---|---|---|---|---|---|---|---|
| Comparison Example | None | | 1.77 | 27 | 1.65 | 35 | 17 |
| 15 | BCD II | 25 | 1.88 | 17 | 1.74 | 27 | 14 |
| 16 | BCD III | 35 | 1.85 | 12 | 1.75 | 24 | 12 |
| Comparison Example | BCD VIII | 25 | 1.89 | 13 | 1.65 | 34 | 29 |

[1] Obtained from the solution viscosity and a relationship between LV and molecular weight (H.M. Koepp and H. Werner, Die Makromolekulare Chemie 32 (1959), page 79).

Similar results are achieved with respect to films which have been processed or treated with and without the benefit of the bis-carbodiimides of the present invention. The importance of at least the central or divalent aromatic radical, preferably phenyl, in the bis-carbodiimide used as the stabilizer has been clearly established. Moreover, good results within the scope of the invention depend highly upon the selection of the two terminal or monovalent radicals represented by R' in the biscarbodiimide, being restricted to either aromatic or the secondary or tertiary lower alkyl. These essentially hydrocarbon radicals as terminal groups may be identical or different, but they are essential together with the central aromatic radical in achieving the desired results.

Other conventional additives such as dyes, pigments and the like can be incorporated in the polyester, it being understood that such additives are essentially inert or non-reactive with respect to the bis-carbodiimides. The final polycondensate or fiber-forming polyester as well as textile materials produced therefrom exhibits excellent mechanical and chemical properties over long periods of use, for example in those applications where durability and resistance to heat and moisture are most evident as in tire cords, drive belts and the like. Many other special utilities will be readily apparent to prior users of polyester threads, textiles, films and the like.

The invention is hereby claimed as follows:

1. A composition comprising a fiber-forming and film-forming polycondensed linear polyester and a small stabilizing amount of about 10 to 150 milliequivalents per kilogram of polyester of at least one bis-carbodimide of the formula

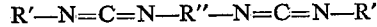

wherein

R' represents a monovalent radical selected from the group consisting of lower secondary alkyl, lower tertiary alkyl, phenyl and phenyl substituted by lower alkyl, and R" represents divalent phenylene.

2. A fiber-forming and film-forming polycondensed linear polyester stabilized against heat and hydrolysis by addition thereto and melt blending therewith a small stabilizing amount of about 10 to 150 milliequivalents per kilogram of polyester of at least one bis-carbodiimide of the formula

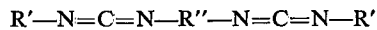

wherein

R' represents a monovalent radical selected from the group consisting of lower secondary alkyl, lower tertiary alkyl, phenyl and phenyl substituted by lower alkyl, and R" represents a divalent phenylene radical.

3. A stabilized polyester as claimed in claim 2 wherein the polyester consists essentially of polyethylene terephthalate.

4. A stabilized polyester as claimed in claim 2 wherein said bis-carbodiimide of said formula is that in which R' represents at least one member selected from the group consisting of phenyl, phenyl substituted by methyl, ethyl or propyl, secondary propyl, secondary butyl and tertiary butyl, and R" represents p-phenylene.

References Cited

UNITED STATES PATENTS

| | | | |
|---|---|---|---|
| 3,193,522 | 7/1965 | Neumann et al. | 260—45.9 |
| 3,231,610 | 1/1966 | Kuhle | 260—551 |
| 3,193,524 | 7/1965 | Holtschmidt et al. | 260—45.9 |
| 3,193,523 | 7/1965 | Neumann et al. | 260—45.9 |
| 3,378,517 | 4/1968 | Knipp et al. | 260—45.9 |
| 3,388,159 | 6/1968 | Sayigh et al. | 260—556 |
| 3,563,849 | 2/1971 | Rye et al. | 161—176 |
| 3,441,540 | 4/1969 | Muller et al. | 260—75 |
| 3,446,763 | 5/1969 | Okozumi | 260—22 |
| 3,157,662 | 11/1964 | Smeltz | 260—288 |

FOREIGN PATENTS 6907958   11/1969   Netherlands.

OTHER REFERENCES

Leibu, Defensive Publication T862, 008, May 6, 1969, Ser. No. 748,659, filed July 30, 1968.

DONALD E. CZAJA, Primary Examiner

R. A. WHITE, Assistant Examiner

U.S. Cl. X.R.

260—45.7 P